United States Patent [19]

Stuettler

[11] Patent Number: 5,870,137
[45] Date of Patent: *Feb. 9, 1999

[54] METHOD AND DEVICE FOR DISPLAYING STEREOSCOPIC VIDEO IMAGES

[75] Inventor: Herbert M. Stuettler, Rankweil, Austria

[73] Assignee: Leica Mikroskopie Systeme AG, Heerbrugg, Switzerland

[ * ] Notice: This patent issued on a continued prosecution application filed under 37 CFR 1.53(d), and is subject to the twenty year patent term provisions of 35 U.S.C. 154(a)(2).

[21] Appl. No.: 663,311

[22] PCT Filed: Dec. 16, 1994

[86] PCT No.: PCT/EP94/04198

§ 371 Date: Jun. 27, 1996

§ 102(e) Date: Jun. 27, 1996

[87] PCT Pub. No.: WO95/18512

PCT Pub. Date: Jul. 6, 1995

[30] Foreign Application Priority Data

| Dec. 29, 1993 | [CH] | Switzerland | 3890/93 |
| Jan. 17, 1994 | [CH] | Switzerland | 135/94 |
| Jan. 24, 1994 | [CH] | Switzerland | 198/94 |
| May 17, 1994 | [CH] | Switzerland | 1524/94 |

[51] Int. Cl.[6] .......................... H04N 13/04; H04N 15/00; H04N 9/47

[52] U.S. Cl. .................................... 348/51; 348/56

[58] Field of Search ................................. 348/51, 42, 56, 348/54, 47, 48; H04N 13/04, 15/00, 9/47

[56] References Cited

U.S. PATENT DOCUMENTS

| 4,393,400 | 7/1983 | Ikushima et al. | 358/92 |
| 4,733,299 | 3/1988 | Glenn | 348/488 |
| 5,083,851 | 1/1992 | MacDonald | 359/462 |
| 5,091,719 | 2/1992 | Beamon, III | 348/51 |
| 5,193,000 | 3/1993 | Lipton et al. | 348/43 |
| 5,572,250 | 11/1996 | Lipton et al. | 348/43 |
| 5,610,661 | 3/1997 | Bhatt | 348/446 |

Primary Examiner—Richard Lee
Assistant Examiner—Nhori T. Diep
Attorney, Agent, or Firm—Foley & Lardner

[57] ABSTRACT

A method for flicker-free display of a stereo image using video techniques and digital processing, as well as a device for carrying out the method, provides enhanced image resolution and greater clarity by displaying progressively scanned frames twice within a frame period on a display. In a variant, the recording or storing of images on conventional recording media is facilitated by virtue of the fact that a half-image detection procedure is carried out before and/or after recording, thus determining the association of frames concerned with corresponding frames in a left-hand or right-hand channel or the association with each other of two frames in parallel channels.

38 Claims, 9 Drawing Sheets

METHOD AND DEVICE FOR DISPLAYING STEREOSCOPIC VIDEO IMAGES

BACKGROUND

This application relates to a method and a device for displaying stereoscopic video images. Such methods are known and are associated in practice with a certain outlay in order to ensure that the stereo images displayed are also of satisfactory quality and, chiefly, also to ensure that the right and left frames are displayed in the correct sequence.

Figure 3:
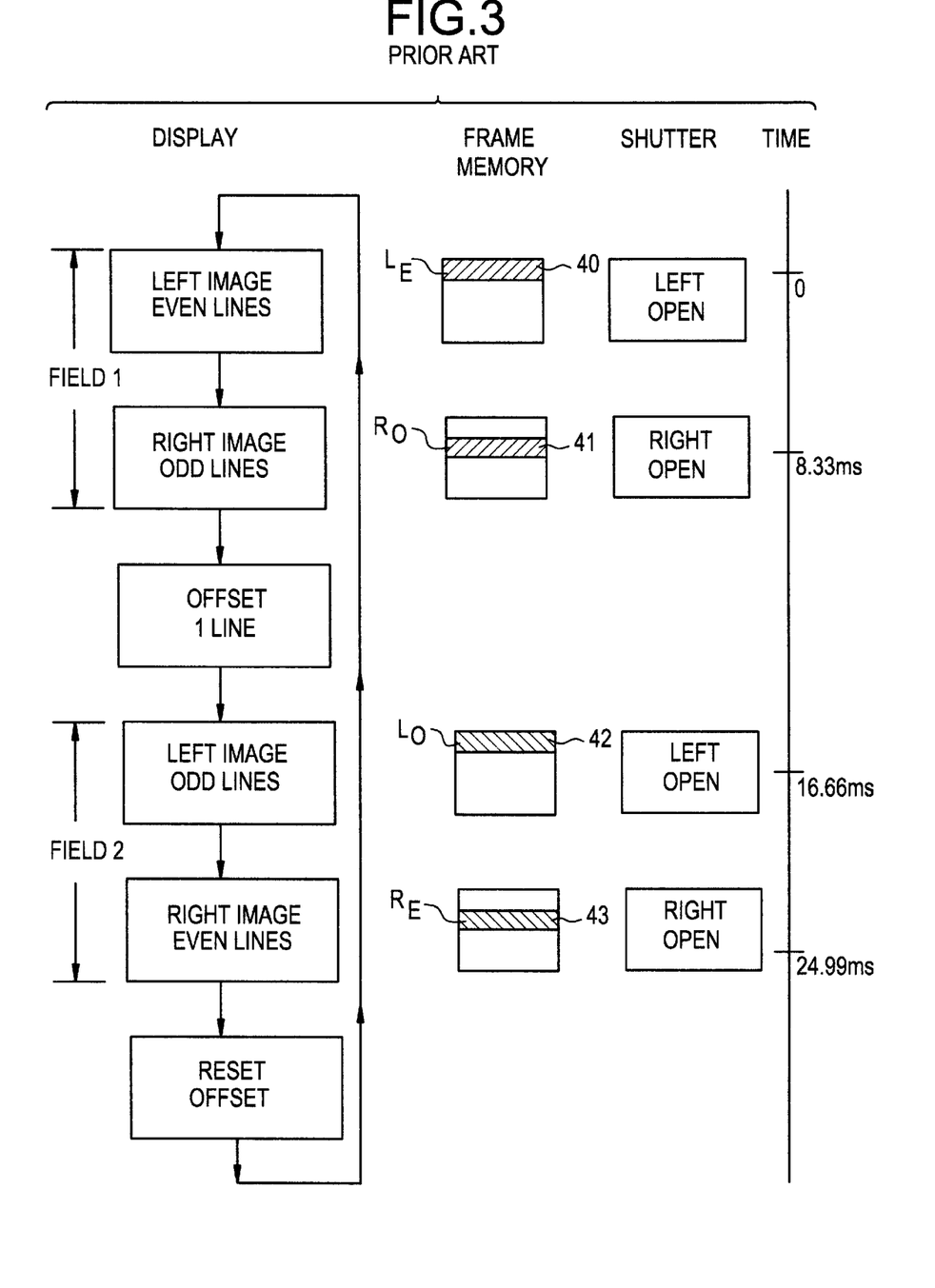
FIG. 3 shows the state of the art in accordance with the quoted US document by comparison with FIG. 2 with an interlaced field display.

In order in conjunction with good resolution to permit an essentially flicker-free display, an American Patent Specification U.S. Pat. No. 5,083,851 proposes to present within 30 ms under computer control for each eye of a viewer two different fields (an even one and an odd one) each. The resolution is substantially improved thereby, the more so as each eye is fed—at least in theory—the complete image information of the respective frame. For this purpose, the method uses a frame store which stores as a whole all four fields of two frames during 60 ms and outputs them twice (during 30 ms in each case) to the display. This known method is represented in FIG. 3 as the prior art.

According to the known method, during 15 ms the left eye is presented with a left even field, and the right eye is presented with a right odd field, whereas in the next 15 ms the left eye is presented with a left odd field and the right eye is presented with a right even field. This process is then repeated once during the next 30 ms before then a new left and a new right frame are read into the frame store. A shutter opens the view onto the display for the left and right eyes alternately, so that during 60 ms the shutter must change its state eight times in order to make the respective frames accessible to the respective eyes. This means a relatively high operating frequency and corresponding quality requirements of the shutter, which is mostly designed as an LCD switching element and is therefore more difficult to operate with increasing operating frequency, since the inertia of the liquid crystal elements has a braking effect. In the case of slight operating delays, crosstalk can easily occur, in which case one eye disadvantageously is also fed field information or parts thereof which are intended for the other eye, and the resolution, which is good per se, could again be ruined. The persistence of a monitor, for example, has a certain significance in this case. In this known method, it is permitted to be only extremely short (at most approximately 4 ms), since an eye requires a field with preferably black image information per displayed field. However, if such a field still persists with its previous picture content, this is as a rule a picture content which is intended only for the other eye. However, since this picture content is on one field whereas the picture content to be correctly displayed is on the other field, it will not be successively overwritten, but possibly not until after 8 ms when the lines of this field are overwritten again. This can lead to discomfort for the viewer. In order to keep this as slight as possible, the persistence of the screen must be reduced, and this can lead to an objective light loss which is precisely extremely undesirable in sensitive applications such as, for example, in operation microscopy.

The more recent DE-C-4 134033 attempts, in the case of a similar method, which in particular aims to manage with conventional video cameras and conventional television sets, to prevent the disadvantages mentioned by dispensing altogether with the display of an even and an odd field per frame and only at all displaying either an even or an odd field per frame. However, the method described there is unsatisfactory for increased demands on the display quality, since the resolution on the television set is unsatisfactory for such demands, all the more so since the entire display is carried out using field technology. In this technology, one field per frame is essentially dispensed with, with the result that for one eye of a viewer respectively only one field (for example, the even one) of a frame (for example, the right one) is displayed, while for the other eye respectively only another field (for example, the odd one) of another frame (for example, the left one) is displayed.

The resolution of the stereoscopic image on the television screen is thus unsatisfactory for many applications in the case of known methods, the shutter frequency is undesirably high in the case of the method first described, the screen brightness is unsatisfactory in the case of some known solutions, and the risk of crosstalk is not completely removed, which can lead in the case of lengthy viewing to headache and discomfort.

SUMMARY OF THE INVENTION

It is therefore the object of the invention to find a simple and reliable method in which the display quality is improved by comparison with the known methods, and the disadvantages advanced are largely avoided.

The object is achieved by means of the method steps in accordance with claim 1, and solved more specially by means of further improved method sequences or variants thereon in accordance with the dependent method claims. The new method generates bright stereo images of high resolution and with no sort of unpleasant side effects, it being possible to apply the new method with a range of different known shutters—for example, with one such as is described in the quoted DE-C-41 34 033. It is preferred to use as shutter: SGS 410 16 inch LCS stereoshutter or SGS 610 19 inch LCS stereoshutter from the Tektronix company.

It is preferred to use a monitor in accordance with one of the following as display: 447B from the Nokia company or GDN 17E01 from the Sony company.

It is also possible to use a multiplicity of known methods for recording the video images, preference being given as a rule to the use of two video cameras or one video camera with an optically switched beam path. Reference is made in this connection to the Swiss Patent Application 3890/93-3, the subject matter of which is a method for the recording and reproduction of stereoscopic video images.

The invention relates, in particular, to the processing of video signals from video cameras, but also from video recording devices etc. The following description is therefore only exemplary and therefore does not exhibit all the design variants which are placed under protection by the Patent claims.

The video images (at least in each case one right and one left) are fed into two video channels (for example, from in each case a right and a left image acquiring device), and then the same frame is displayed alternately twice one after another. In the case of two raster image cameras (progressive scan), the content of each camera-CCD is, for example, interrogated twice—for which purpose it is preferably buffered in a frame store—and displayed in the same sequence. Of course, in this case the period and the frequency of the display of the frames (raster images) are significant, a time frame of below 50 ms per four frame displays, in particular of 40 ms or 30 ms, being optimum.

However, the invention can be applied very well in the case of systems which work using conventional video cameras with fields according to the interlacing method (interlaced scan), in which both the signal of the camera assigned to the left eye and the signal of the camera assigned to the right eye have even and odd video fields. However, the invention also comprises a variant in which for the sake of simplicity, only one field is generated at all per image acquiring device, and not until later is there generated by interpolation from each field a second field matching the latter. In the case of such variants with fields or fields artificially generated therefrom, these are advantageously firstly assembled via an image storage device (for example raster image buffer) to form an image which can be displayed as a raster image (progressive scan) in order thereby to circumvent the disadvantages of U.S. Pat. No. 5,083,851.

The stereoscopic images obtained by the invention permit a vision which is ergonomically correct and bright.

Advantageously, the invention also results in a doubling of synchronous and asynchronous, simultaneously present standard video signals.

Figure 4:
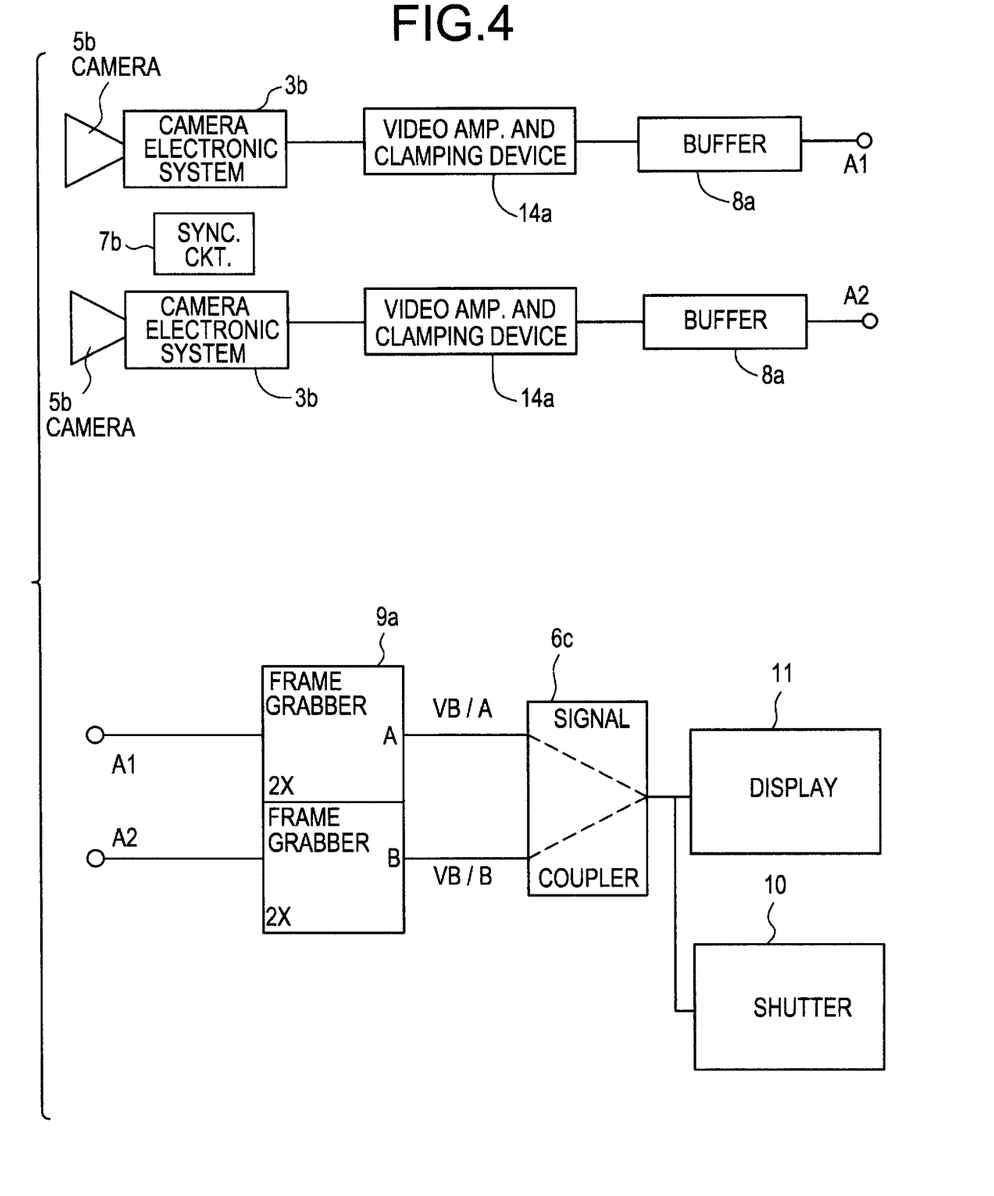
FIG. 4 shows a design having two conventional video cameras with standard video signal and conversion of these signals into raster images, so that progressively scanned raster images can be displayed alternatingly.

The embodiment according to FIG. 4 further reduces the risk of crosstalk, the more so as the shutter follows the writing direction of the electron beam (scanning direction) in strips.

According to a further exemplary embodiment, each field obtained from a video camera is interpolated or integrated by a central processor to form a raster image and respectively displayed only once. This results in a doubled refresh rate, because instead of the repeated display of a frame there is now displayed after a first raster image consisting of a first field and a further interpolated field a second raster image consisting of a second field and a further interpolated field. Since the second raster image comprises the second field, which is subsequent to the first field in time, a display is achieved which comes substantially closer to the actual state of motion. Higher rates of motion at the object being viewed can be perceived without the occurrence of streaking. Furthermore, despite the application of interpolation methods, no perceptible blurring is produced in the display. This results from the circumstance that the respectively subsequently delivered second interpolated image reproduces the unchanged, uncalculated image information precisely in those lines in which the first interpolated image displays the calculated, interpolated scanning line information. Inaccuracies in calculation and interpolation are thereby compensated, with the result that they are no longer perceptible.

The exemplary embodiments mentioned all have the advantage that a stereoscopic raster image without flicker can be displayed on the monitor.

BRIEF DESCRIPTION OF THE DRAWINGS

Further details of the invention are explained in more detail below with the aid of exemplary embodiments. The Figures show the following, in particular.

Identical reference symbols signify identical components. Identical reference symbols with different indices signify similar components.

List of Reference Symbols and Definitions of Terms

Within the meaning of the invention:

A stereoscopic video image is two correlated frames of a left and right image channel, the frames having at least one video field (HB), but in the case of being displayed are designed as a raster image (VB) in which they are then displayed in a progressively scanned fashion. The raster image (VB) can in this case be originally constructed from a correlated pair (VB) of two fields (HB). Such a pair (VB) can also, within the meaning of the invention, consist of two interlaced fields (HB), or of two simultaneously present and thus no longer separated fields (progressive scan), to the extent that the latter appears on the display.

Interpolated fields (HB) are fields which have been obtained by computational evaluation of existing image information from a field (HB). Raster images may have been obtained both from HB and from HB.

The designation HB/A stands for fields (HB) of one image channel, while the designation HB/B stands for fields of the associated other image channel. The index X signifies the progressive numbering of the respective field (HB). The index 0.1 or 0.2 stands for the respective even or odd field (HB).

A stands for contact parts which are connected to one another in the operational case.

1 Video recording device; this includes, for example,: video recorders, video disk devices, digital storage devices of every sort.

2 Video reproducing device; this includes all devices with which it is possible to reproduce recordings of devices according to 1.

3 Camera electronic system; this includes all devices which electronically acquire images acquired by an optoelectronic recording device and render them processible.

4 Field detector; this includes all signal analyzing devices which can detect a field (for example, an even one) or distinguish it from an associated second field (for example an odd one) and, as the case may be, can undertake suitable changeovers for the purpose of relaying signals.

5 Image acquiring device; this includes still or fullmotion video cameras, any CCD or other optoelectronic array circuitry etc.

6 Video signal coupler; this includes all interfaces which switch signals from two parallel channels—in particular alternating—to an electronic path. They can be designed, in particular, as a graphics card.

7 Camera synchronization system; this includes synchronizing elements which both synchronize two camera electronic systems with one another and, as the case may be, clock further elements for the purpose of image processing (for example framegrabbers, shutters) and/or generate signals which can be recorded if required on video data media.

8 Raster image buffer (frame store); this includes all storage elements which can store at least two correlated fields of a frame or at least one raster image. According to the invention, they are used, in particular, to increase the frequency of the displayed images in relation to the recording frequency by recalling the same image information from them more frequently (twice). They permit different read in and read out rates.

9 Framegrabber; this includes all electronic circuits (real time analog-to-digital converters) which convert signals of a video raster image or video field into signals which can be further processed digitally, and which condition them for further processing in a computer monitor or the like.

10 A shutter is an electronically controlled stop which—mostly in cooperation with other optical or electronic components—exposes the view to only one or other eye of a viewer. It is not important in this case for the application of the invention whether the shutter 10a is directly upstream of the display or whether a dedicated shutter 10b (active spectacles) is provided before each eye. In the case of fixed-pixel displays, for example LCD displays, the term shutter also comprises within the scope of the invention lenticular screens or the like, which in any case omit a separation of the reproduced image information on the right and left eyes of a viewer (such optical components are preferred to the extent that the viewer can manage without additional aids such as spectacles etc. and therefore also has to accept less light loss).

11 Monitor; this includes all image displaying devices and displays, in particular cathode ray tubes with a short persistence (for example under 5–10 ms) as well as LCD displays etc.

12 Interpolator; this includes devices which create two correlated fields from one field by filling the line interspaces of a field (HB) with interpolated image information, preferably obtained from the image information of the two lines of the relevant field (HB) which bound the line interspaces.

13 Video divider; divides a video signal from one path into at least two paths so that the same signals are present on both paths.

14 Video amplifier and clamping device; correspond to the conventional devices in video signal processing.

15 Field buffer; this includes all those storage devices, and therefore also raster image buffers, as the case may be, which can store at least one field.

16 Raster image buffer with interpolation on framegrabber; these are integrated components which create by interpolation from a field a raster image which they render capable of being retrieved in a form which can be processed by a computer. According to the invention they serve, in particular, to increase the frequency of the images displayed in relation to the recording frequency or to create a raster image frequency from a prescribed field frequency.

DESCRIPTION OF PREFERRED EMBODIMENTS

Figure 1:
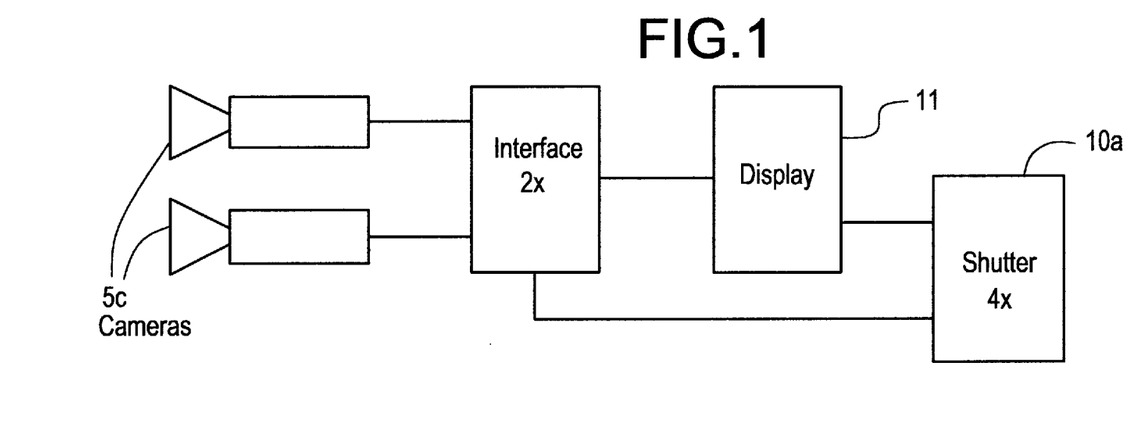
FIG. 1 shows a recording part of a device according to the invention with 2 coordinated raster image cameras.

FIG. 1 shows a recording part of a device according to the invention with two coordinated raster image cameras 5c whose CCDs are each interrogated twice by the interface one after another at an interval of 20 ms each, and whose content is relayed twice in each case in the same interval to the display 11 or displayed thereon. A shutter 10a is synchronized with the display or with the interface.

In a first exemplary embodiment, the images of a pair of stereo images which are assigned to the right and left eyes are recorded by coordinated cameras 5b (FIG. 4). A synchronization circuit 7b serves to synchronize with one another the frames acquired by the cameras 5b. A camera electronic system 3b ensures that the output signals of the two cameras 5b each have even and odd fields HB/A1.1, HB/A1.2 and HB/B1.1, HB/B1.2, respectively. These signals are normalized in accordance with an existing standard by means of a video amplifier and a video clamping device 14a. Thereafter, the even and odd video fields (HB) in the two channels are stored in one raster image buffer 8a each. One framegrabber 9a each then takes over the stored image information twice one after another, preferably in a clocked fashion, using the progressive type of scanning, and leads it twice in each case within a frame period (for example 20–60 ms) to the display 11 via a signal coupler 6c. A shutter 10 which exposes the view only onto one or other eye of the viewer is connected to the signal coupler 6c.

Figure 5:
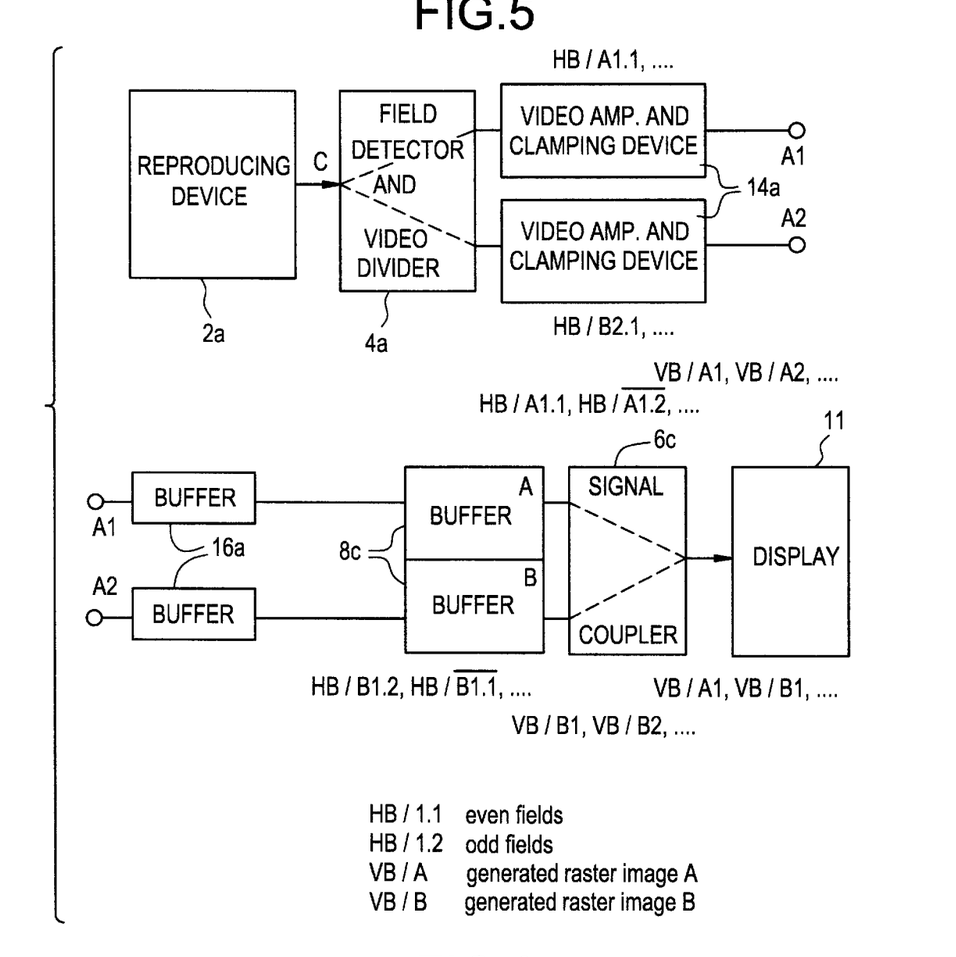
FIG. 5 shows an alternative in which the standard video signals originate from a video recorder and generated raster images are displayed.

FIG. 5 shows a second exemplary embodiment in which video signals are extracted from a reproducing device 2a and are separated from one another by a field detector and video divider 4a, with the result that in one of the channels even, and in the second channel odd video fields are processed.

This separation is carried out with the aid of video field detectors 4a, for example a type SM II VI.4 detector from Fast Electronic GmbH. In one of the two channels, either the even or the odd video fields (HB) are detected and respectively fed, via a video clamping device 14a, to a raster image buffer 16a. In the latter, an interpolation circuit is used in each case to generate a further field which is assembled with the already existing field per channel to form a raster image. These frames which are now present by channel are in each case fed to a further raster image buffer 8c from which they are respectively read out with fourfold frequency and fed to a video signal coupler 6c for the purpose of alternately bringing together the frames (TB) on a display 11.

Figure 6:
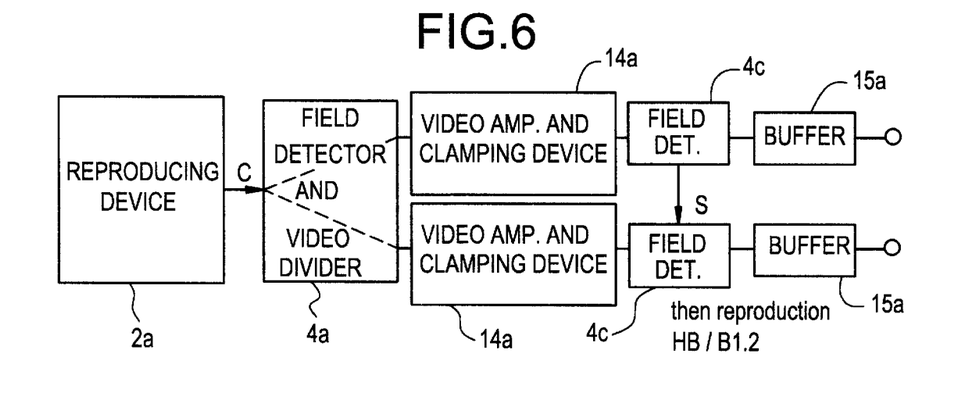
FIG. 6 shows a further alternative for the first part of the reproducing part according to FIG. 5.

Alternatively, in accordance with FIG. 6, a field detector 4c is arranged downstream of the video clamping device 14a per channel, the field detector 4c of the first channel transmitting a control signal s to the field detector of the second channel after the first field HB/A1.1 of the first channel has been detected. Only thereafter, is the second field HB/B1.2 of the second channel relayed to the field buffer 15a, so that the second field HB/B1.2 of the second channel and first field HB/A1.1 of the first channel buffered in the field buffer 16a can respectively be fed to the raster image buffer 16a for interpolation.

In the exemplary embodiment in accordance with FIG. 5, the even video fields of the first channel and the odd video fields of the second channel are read for the purpose of further processing in a raster image buffer assigned to the video channel, while the exemplary embodiment according to FIG. 6 provides for the interposition of one field buffer 15a each. In both exemplary embodiments, use is made of an interpolation method, in which from one frame first only one field is obtained, and the number of lines of the stored images is doubled. The interpolated images of the two channels are then fed twice in each case in an alternating fashion to a display 11. The images are shown on the display 11 as progressively scanned raster images with the fourfold horizontal deflection frequency of the original recording with the cameras 5.

Figure 7:
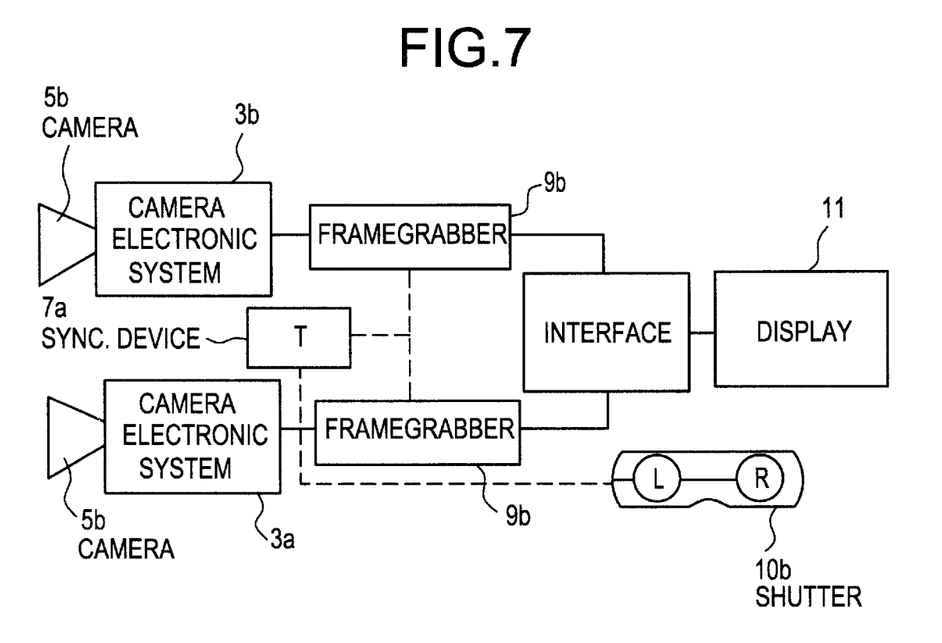
FIG. 7 shows a further embodiment for a design of the invention having active shutter spectacles.
Figure 8:
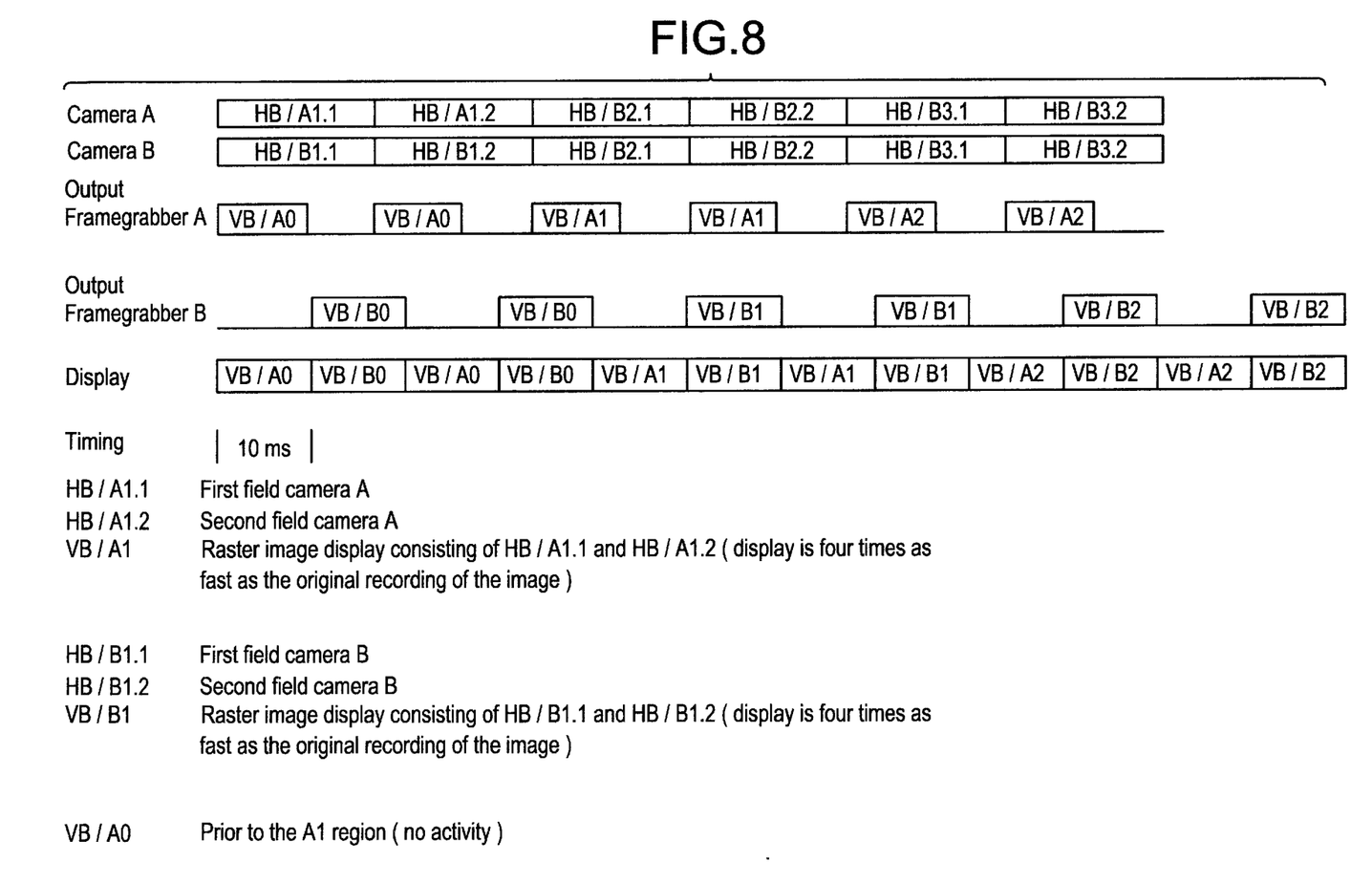
FIG. 8 shows a diagram of the temporal progression of the signal sequence in a device according to FIG. 7.

The simplified representation in accordance with FIG. 7 together with the diagram according to FIG. 8 shows once again the main essence of the invention:

Two conventional video cameras 5b with a standard camera electronic system 3a deliver standard video signals, scanned using the interlacing method, to two clocked framegrabbers 9b with an integrated raster image buffer, which convert the fields into raster images and, as described, relay them to the display 11 twice (even more frequently if required) in each case via a signal coupler 6c as an interface. A synchronization device 7a serves the purpose of synchronously relaying the frames into the framegrabber 9b. A shutter 10b (in this case active shutter spectacles which in each case prevent one eye seeing through onto the display) undertakes to divide the frames displayed. The invention can in this case be used both for the PAL standard and for the NTSC standard—even asynchronously.

The rate of display is thus 4 times faster than the rate of recording. If required, within the scope of the invention it would also be possible to select possible variations for the rate of representation by, for example in a manner similar to a time-lapse recording, not displaying individual frames, and in return displaying raster images of previous frames more often than twice. In specific cases, this could still further improve the resolution subjectively perceptible for the viewer.

Figure 2:
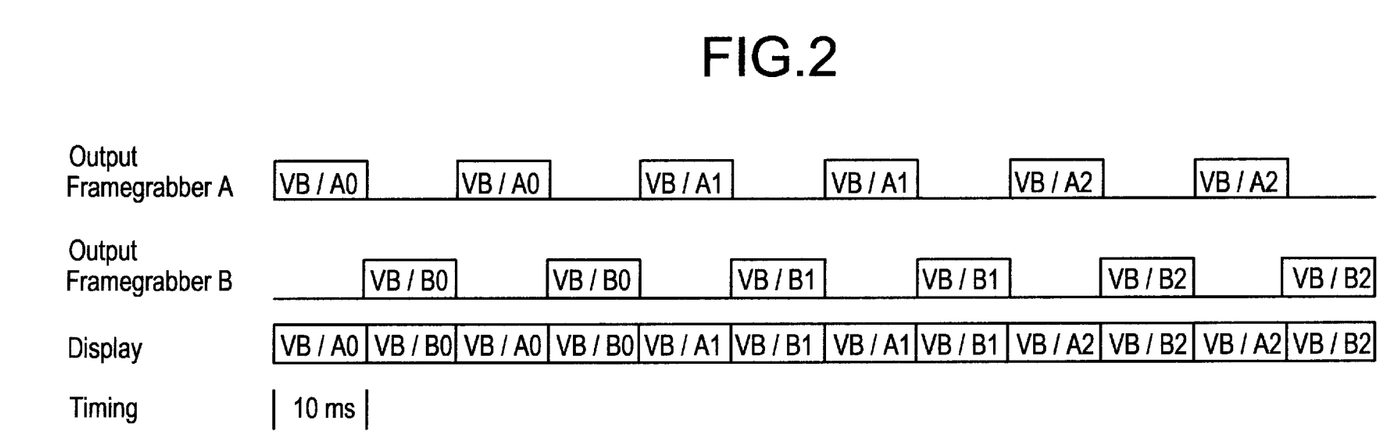
FIG. 2 shows a diagrammatic representation of the signal sequence at the output of the framegrabbers (for example associated with the cameras according to FIG. 1) and on the display.

As emerges from FIG. 2 and FIG. 8, the fields (HB) are read in with a frequency of 50 Hz in each camera A and B and, after the channelwise further processing described above, are read out as raster images from the framegrabbers A and B with fourfold frequency and displayed. Each specified raster image of a framegrabber A or B consists of two fields HB, with the result that the acquired fields HB are displayed with a picture frequency of 200 Hz. In this case, the frames are alternately displayed as raster images: in which case they have a frequency of 100 Hz. The frames are displayed per channel with one repetition before a further frame is displayed. This is rendered possible by raster image buffers and field buffers which have the property of simultaneously reading information in and out.

Figure 10:
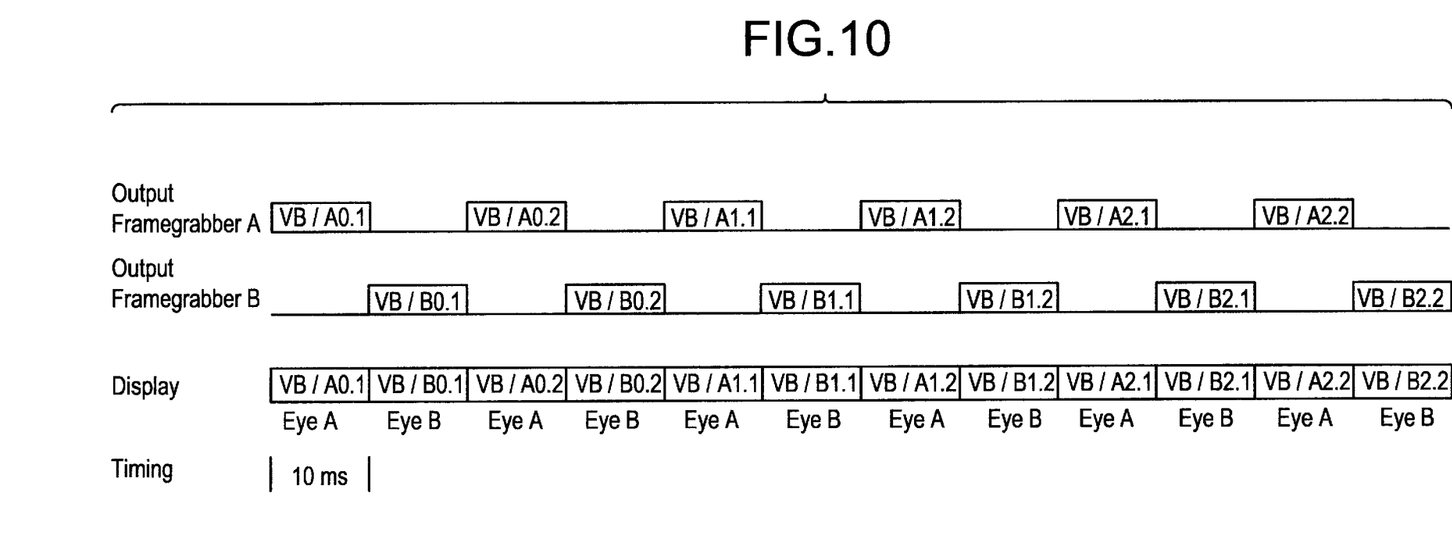
FIG. 10 shows a diagrammatic representation of the signal sequence at the output of the framegrabber and at the display according to a further exemplary embodiment.
Figure 11:
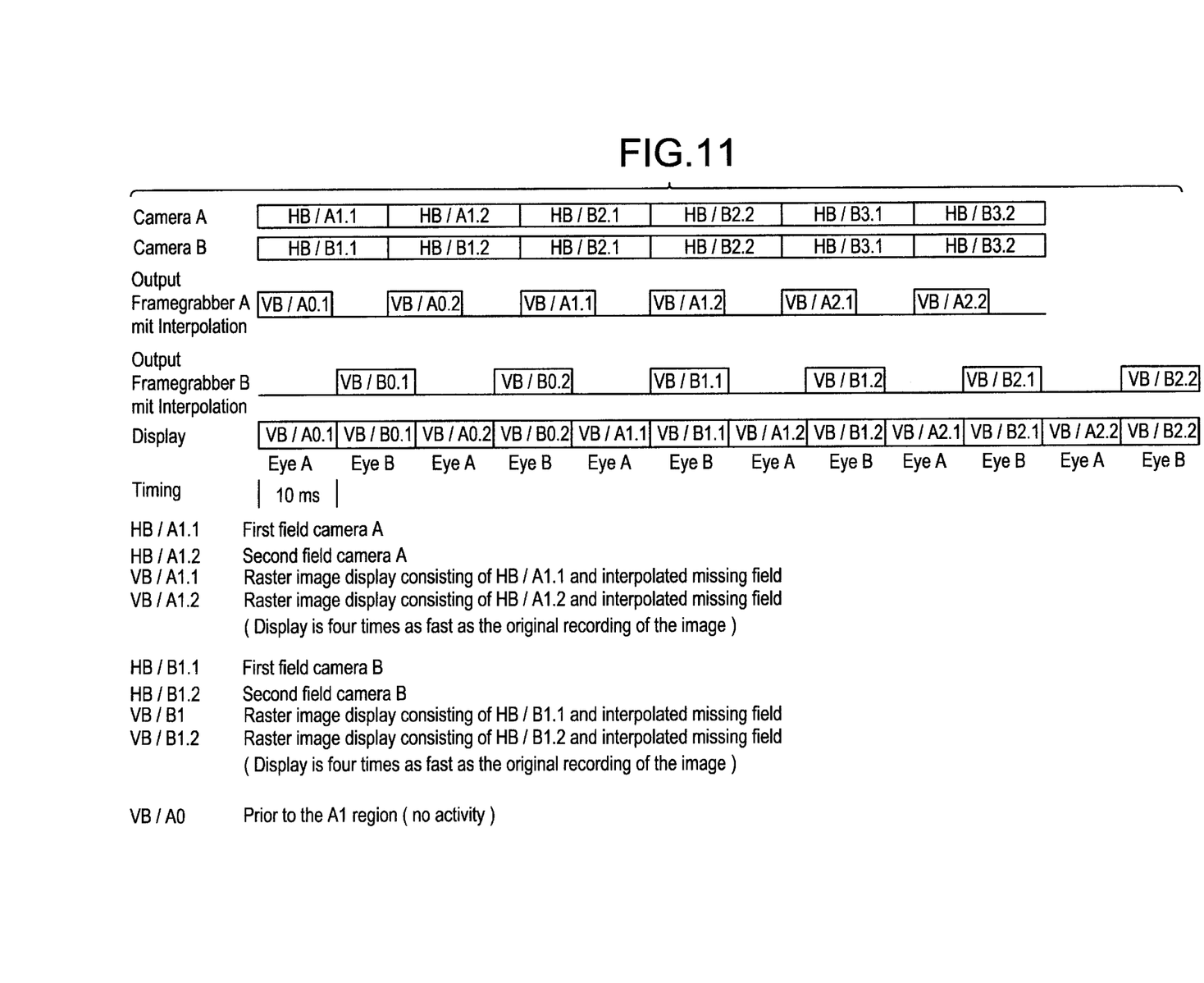
FIG. 11 shows a diagram of the temporal progression of the signal sequence in a device according to the further exemplary embodiment.

According to a further exemplary embodiment in accordance with FIG. 10 and FIG. 11, the fields HB are read in in each camera A and B with a frequency of 50 Hz in agreement with the exemplary embodiment described above. However, by contrast with the foregoing exemplary embodiment, fields are interpolated, the interpolated field being generated with a more up to date existing field to form a complete frame. Whereas the first raster image of the first channel is formed from the first field and a further interpolated field, the second raster image of the same channel is produced from the second field instead of the first and a further interpolated field. It is possible as a result to double the refresh rate without the need to increase the outlay. It is only different fields which are used for the purpose of raster image display or interpolation.

Figure 9:
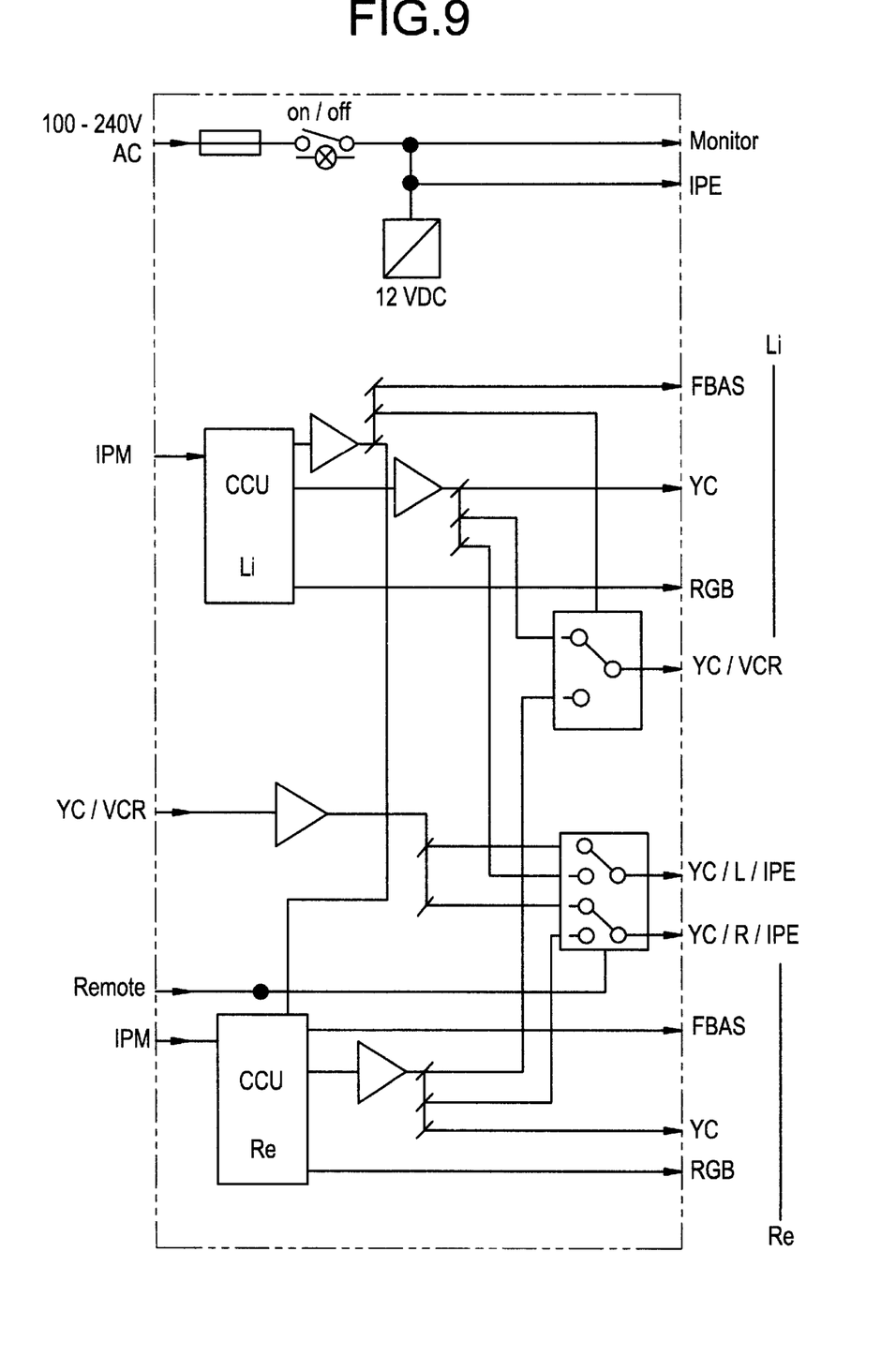
FIG. 9 shows a practical example of an implemented interface with a video recorder input YC/VCR, a video output YC/VCR and two video camera inputs IPM for recording stereoscopic images on a conventional video recorder.

As a typical circuit, both exemplary embodiments described above can have an interface in accordance with FIG. 9. The interface comprises the two field detectors, assigned by channel, and the signal coupler connected thereto. The output signals of the right and left cameras are present at the input IPM of the interface. These are processed by channel in a camera control unit (CCU), the left channel being processed in the CCU/Li and the right channel being processed in the CCU/Re. The output signals of these camera control units CCU are then, on the one hand, fed via a respective amplifier device to a live mode circuit in which the signals of the right and left frames can be changed over, and then relayed as output signals YC/L/IPE and YC/R/IPE via a left and right channel, respectively, of a signal processing unit (not represented) for the purpose of being displayed on a reproducing monitor. On the other hand, the output signals are fed to a control circuit in which they are conditioned for recording on a video recorder and are fed to a video recorder as output signals YC/VCR. Further signals FBAS, YC and RGB usual for displaying an image are optionally generated at the outputs of the interface.

Furthermore, an output signal of a video recorder can be applied to an input YC/VCR of the interface so that after said output signal has been fed to the live mode circuit the signal recorded on the video recorder is available at the output of the interface for the purpose of being displayed on the reproducing monitor. A further remote input of the interface renders possible as a remote control the optional through-connection of the signal recorded on the video recorder or of the signal acquired by the camera. A conventional power supply unit for providing the power supply of the interface is represented in the upper part of FIG. 9.

Alternatively, the invention is suitable in the way described above for processing raster images instead of fields, with the result that the use is ensured of cameras which make available only raster images for signal processing.

I claim:

1. Method for displaying a stereoscopic image, which is constructed from one right and one left frame each, on a display (11) which is assigned at least one separating device, (shutter 10), which always assigns only frames of one image channel to each eye of the observer, characterized in that each frame is displayed alternately with the other frame as in each case a progressively, by line, scanned raster image on the display (11).

2. Method according to claim 1, characterized in that the frames are displayed at least twice per recording period, signal period of an individual frames, for each frame.

3. Method according to claim 1, characterized in that the horizontal image deflection on the display (11) is at least 60 kHz, while the vertical image deflection is at least 100 Hz.

4. Method according to claim 1, characterized in that double display of two frames takes place within at least 60 ms.

5. Method according to claim 1, characterized in that double display of two frames takes place within or at less than 40 ms.

6. Method according to claim 1, characterized in that in case of progressively scanned display of the frames on the display (11) the shutter (10) is activated and deactivated successively in accordance with the scanning direction, from top to bottom or from bottom to top.

7. Method according to claim 6, characterized in that the shutter (10) is provided with a line-shaped or strip-shaped vertical structure which follows in a changeover sequence of the scanning direction on the display (11).

8. Method according to claim 1, characterized in that raster images (VB) are obtained by converting conventional video signals using an interlacing method from two fields (HB, HB) each by buffering the same in a frame store (8; 9; 16), frames to be read out as raster images from raster image buffers (8*a*) by means of framegrabbers (9*a*) progressively by line and fed to a video signal coupler (6*c*), from which the frames of one channel are fed alternating with the frames of the other channel to the display (11) at a suitable frequency.

9. Method according to claim 8, characterized in that the frames are read out from the raster image buffers (8*a*) progressively, by line, by means of framegrabbers.

10. Method according to claim 8, characterized in that a graphics card of a computer or a reproducing monitor is used as the video signal coupler (6*c*).

11. Method according to claim 8, characterized in that from the video signal coupler (6*c*) the frames of one channel are fed at four times the horizontal deflection frequency in a fashion alternatingly with the frames of the other channel to the display (11).

12. Method according to claim 1, wherein a video signal originates at the output of a reproducing device (2*a*), characterized in that it is fed to a single field detector (4*a*) with an integrated video divider, in which latter the first field (HB/A1.1 . . . ) of the video signal is detected and fed via the video divider to the first channel, while the second field (HB/B1.2 . . . ) is fed to the second channel, or in that it is fed only to a video divider from where the signals are divided into two processing channels in which in each case the frame which does not belong to the associated processing channel is blanked so that in each channel it is possible to process a field (HB) of its assigned frame, the signals of two fields (HB/A1.1 . . . and HB/B1.2 . . . ) each being fed to an interpolator (12*a*) and to a raster image buffer (8*b*), each interpolator (12*a*) assembling the respectively missing lines between the field of its channel by means of generated lines to form a second field (HB) and the latter being fed further to the respective raster image buffer (8*a*), so that it is possible in the raster image buffer to retrieve a complete frame or a pair (VB) of two correlated fields for the purpose of further processing and progressively scanned display on the display (11).

13. Method according to claim 1, characterized in that the frames are read out as raster images from raster image buffers (8*b*) by means of framegrabbers (9*a*) progressively, by line, and fed to a video signal coupler (6*c* or 6*b*) from where the raster images are fed in a temporal sequence to the display (11) at a suitable frequency.

14. Method according to claim 1, wherein the display is an LCD monitor or a CRT monitor, characterized in that the display period or the persistence of the screen is selected to be smaller than 9 ms.

15. Method according to claim 1, characterized in that two frames (TB) are alternately displayed with two of the other frames (TB) per conventional standard frame.

16. Method according to claim 15, characterized in that each of the two frames (TB) which are displayed on the display (11) during a standard frame are constructed from one field (HB) each and a frame (HB) interpolated therefrom generated by an interpolation method.

17. Device for carrying out a method according to claim 1, having a display (11) for displaying the stereoscopic image, a separating device (shutter 10) being provided for the channelwise assignment of the frames of the first and second channel to the corresponding eyes of the observer, characterized in that a frame store (8*a*, 9*a*, 16*a*) is provided for buffering the right and left frames (TB), with the result that the frames (TB) are read out progressively, by line, as raster images and the frames of one channel are displayed alternately on the display (11) with the frames (TB) of the other channel with at least twice the picture frequency.

18. Device according to claim 17, characterized in that the frame store (8*a*, 9*a*, 16*a*) has per channel a raster image buffer (8*a*) for buffering the frames (TB), and per channel a framegrabber (9*a*) which reads the frames (TB) at four times the picture frequency from the raster image buffer (8*a*), and feeds the frames to the display (11) for the purpose of alternately displaying the frames (TB).

19. Device according to claim 17, characterized in that a signal coupler (6*c*) is connected to a framegrabber (9*a*) for the purpose of alternately feeding the frames.

20. A method for displaying a stereoscopic image, which is constructed from one right and one left frame each, on a display which is assigned at least one separating device that assigns frames to eyes of the observer, comprising the step of:

displaying each frame alternately with another frame in each case as a raster image scanned progressively line by line on the display.

21. A method according to claim 20, wherein frames are displayed at least twice per recording period for each frame.

22. A method according to claim 20, wherein a horizontal image deflection on the display is at least 60 kHz and a vertical image deflection is at least 100 Hz.

23. A method according to claim 20, wherein double display of two frames takes place within 60 ms.

24. A method according to claim 20, wherein double display of two frames takes place within 40 ms.

25. A method according to claim 20, wherein in a progressively scanned display of frames on the display, a shutter is activated and deactivated successively in accordance with the scanning direction.

26. A method according to claim 25, wherein the shutter includes a line-shaped or strip-shaped vertical structure which follows in a changeover sequence of a scanning direction on the display.

27. A method according to claim 20, wherein raster images are obtained by converting conventional video signals using an interlacing method from two fields each by buffering the same in a frame store, frames of one channel being fed alternating with frames of another channel to the display via a video signal coupler.

28. A method according to claim 27, wherein frames are read out from raster image buffers progressively, line by line, by framegrabbers.

29. A method according to claim 27, wherein a graphics card of a computer or a reproducing monitor is used as the video signal coupler.

30. A method according to claim 27, wherein from the video signal coupler the frames of one channel are fed at four times a horizontal deflection frequency in a fashion alternatingly with frames of another channel to the display.

31. A method according to claim 20, wherein a video signal originates at an output of a reproducing device to be fed to a single field detector with an integrated video divider, in which a first field of the video signal is detected and fed via the video divider to a first channel, while a second field is fed to a second channel, or wherein the video signal is fed to a video divider from where the signals are divided into two processing channels in which in each case the frame which does not belong to the associated processing channel is blanked, the signals of two fields each being fed to an interpolator and to a raster image buffer, each interpolator assembling respectively missing lines between a field of its channel by generated lines to form a second field and the latter being fed further to a respective raster image buffer, such that a complete frame or a pair of two correlated fields is generated for the purpose of further processing and progressively scanned display on the display.

32. A method according to claim 20, wherein frames are read out as raster images from raster image buffers by framegrabbers progressively, line by line, and fed to a video signal coupler from where raster images are fed in a temporal sequence to the display.

33. A method according to claim 20, wherein the display is an LCD monitor or a CRT monitor, and wherein the display period or the persistence of the screen is smaller than 9 ms.

34. A method according to claim 20, wherein two frames are alternately displayed with two other frames per a standard frame.

35. A method according to claim 34, wherein each of two frames which are displayed on the display during a standard frame are constructed from one field each and a frame interpolated therefrom generated by an interpolation method.

36. A device for displaying a stereoscopic image constructed from one right and one left frame, comprising:

a display for displaying the stereoscopic image;

a separating device for channelwise assignment of frames of first and second channels to corresponding eyes of an observer; and a frame store for buffering right and left frames such that the frames are read out progressively, line by line, as raster images and the frames of the first channel are displayed alternately on the display with the frames of the second channel at a rate of at least twice the picture frequency.

37. A device according to claim 36, wherein the frame store has per channel a raster image buffer for buffering the frames, and per channel a framegrabber which reads the frames at four times the picture frequency from the raster image buffer, and feeds the frames to the display for the purpose of alternately displaying the frames.

38. A device according to claim 37, further comprising a signal coupler connected to the framegrabber for alternately feeding the frames.

* * * * *